Patented Apr. 13, 1948

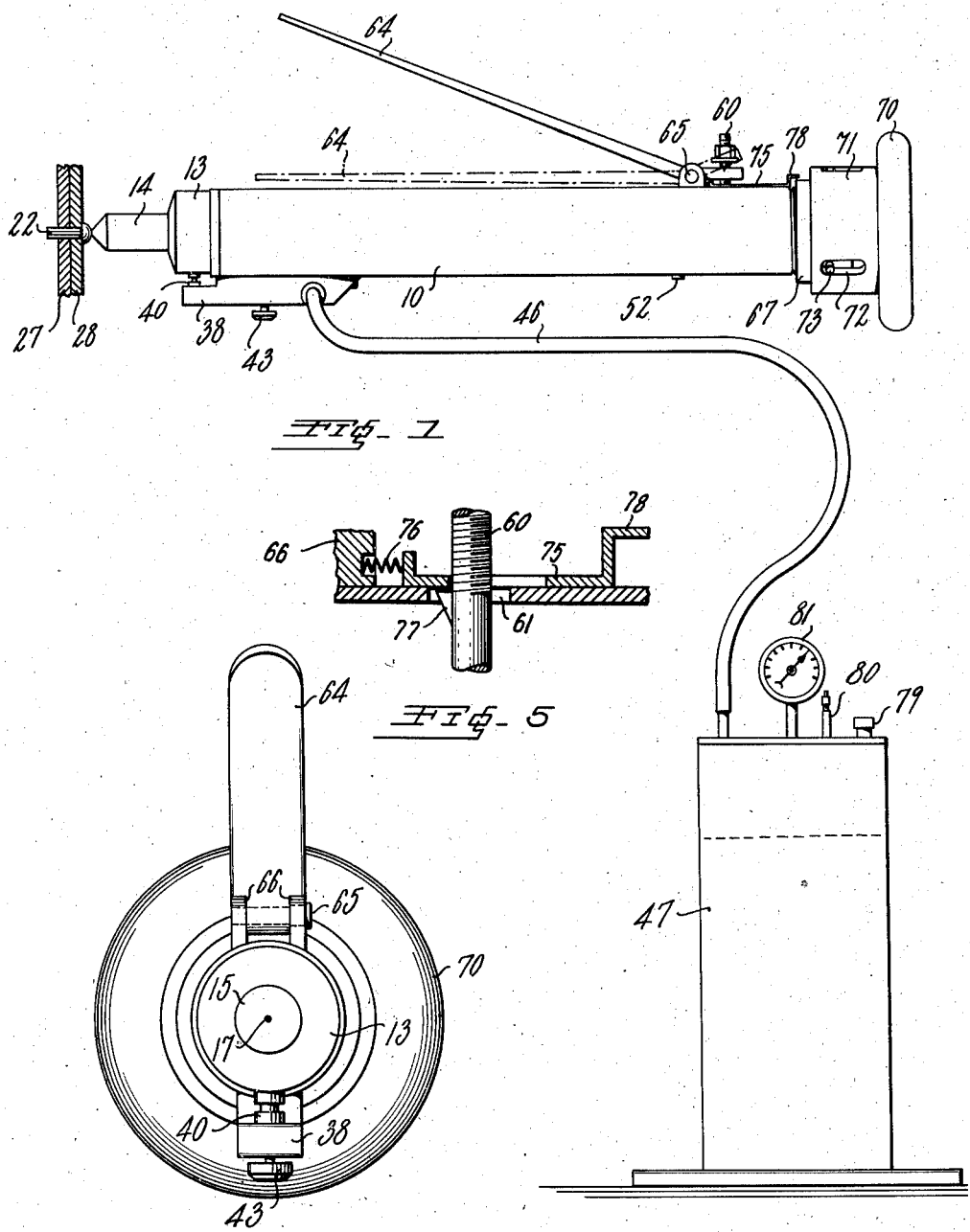

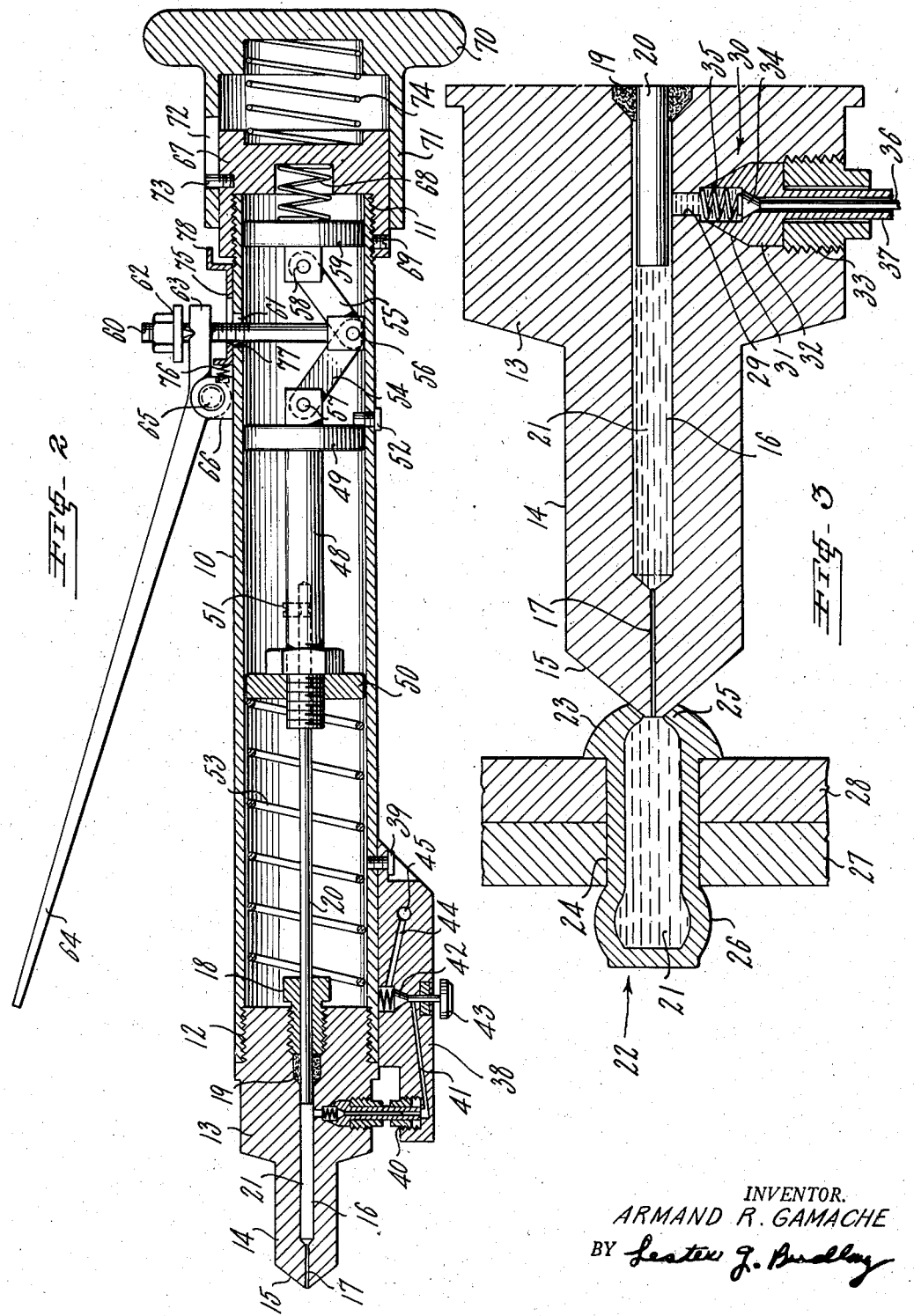

2,439,566

UNITED STATES PATENT OFFICE 2,439,566

HYDRAULIC GUN

Armand R. Gamache, Springfield, Mass., assignor to United States Rubber Company, New York, N. Y., a corporation of New Jersey Application November 2, 1943, Serial No. 508,753

3 Claims. (Cl. 222—123)

This invention relates to an hydraulic gun adapted to set or expand hydraulic rivets by forcing liquid into the bore of a rivet under sufficient pressure to expand or blind set the protruding end of the rivet.

The Jakosky Patent No. 2,331,324 for Method of and apparatus for making rivets, discloses hollow rivets designed to be expanded or blind set by forcing a liquid into the bore of the rivet under sufficient pressure to expand hydraulically the end portion of the rivet remote to its head. The pressure required to expand hydraulically even a small aluminum rivet is very high and may amount to 20,000 pounds per square inch or higher.

The present invention contemplates a simple and light-weight hydraulic gun which may be easily operated by hand upon exerting a pressure of a few pounds upon a lever to thereby set a hollow rivet by producing in the bore thereof a pressure capable of causing the side walls of the rivet near an end thereof to expand outwardly and form a bulbous head.

In order to provide a gun wherein the application of a pressure of a few pounds upon a hand lever would serve to produce in the gun a hydraulic pressure of many thousand pounds per square inch, operating mechanism especially designed for this purpose had to be worked out. Also when such high pressures are produced the pressure chamber must be especially designed throughout to withstand these pressures and threaded parts adjacent the chamber must not be directly exposed to these high pressures, because even when the tightest threads are used the hydraulic fluid will find its way along the threads and escape.

One object of the present invention is to provide a hydraulic gun for expanding or blind setting hydraulic rivets, which gun will weigh only a few pounds, may be quickly and easily engaged with each rivet to be set and operated by hand to expand the rivet by exerting a few pounds of pressure on a lever attached to the gun.

Another object of the present invention is to provide a gun of the above type whereby a measured quantity of hydraulic liquid may be forced into the hollow rivet so as to expand the rivet a predetermined amount, and also to provide the gun with adjustable means whereby this measured quantity may be increased or decreased to thereby vary the amount of expansion imparted to the rivet, or to adjust the gun to expand different size rivets.

Another object of the invention is to provide an hydraulic gun for forcing liquid into the bore of an hydraulic expandable rivet, and comprising a gun body having an end portion formed with a pressure chamber and a pointed apertured end adapted to seat in the entrance to the bore of the rivet to form a liquid tight engagement therewith, and which gun is provided with a pressure producing plunger slidable in the pressure chamber through a stuffing box and the chamber has a one-way valve through which the hydraulic liquid is supplied at will to the chamber, so that when the gun chamber is filled and the plunger is advanced to subject the liquid in the chamber to high pressure, the liquid will be prevented from escaping through the stuffing box or valve and will be forced from the end of the gun into the hollow rivet to expand the rivet.

Another object of the invention is to provide a toggle lever for advancing the plunger in the chamber to establish therein the desired extremely high pressure, and in a hand operated lever adapted to move the toggle lever from the bent to its straight position and thereby produce a maximum thrust upon the plunger. Another object is to provide adjustable means adjacent to one end of the toggle lever which may be readily adjusted to increase or decrease the amount of movement imparted to the plunger by a complete operation of the hand lever. Another object is to provide a pressure indicating head yieldingly attached to an end of the gun and operable to indicate to the user of the gun when it is seated against the rivet head with sufficient force to form a liquid-tight engagement therewith, and still another object is to provide locking means under the control of said head which prevents the plunger operating lever from being actuated until the end of the gun is firmly seated in the bore of the rivet.

The above and other objects of the invention and novel arrangement of parts will be more fully understood from the following description when read in connection with the accompanying drawings wherein is shown one good practical embodiment of the invention.

In the drawings:

Fig. 1 is a side elevation of an hydraulic gun constructed in accordance with the present invention and shown in engagement with a rivet, and connected by a flexible tube with the liquid supply pressure receptacle.

Fig. 2 on a larger scale is a longitudinal sectional view through the gun of Fig. 1.

Fig. 3 on a still larger scale is a longitudinal sectional view through an expanded rivet and the pressure chamber portion of the gun of Fig. 2; and Fig. 4 is an enlarged end view of the gun of Fig. 1 looking toward the rivet engaging end thereof; and Fig. 5 is an enlarged sectional view of locking means shown in Fig. 2.

An hydraulic gun such as herein contemplated may be given various embodiments since the essential features thereof are small, and the general shape and size of most of the parts of the gun depend largely upon the size desired for convenience in handling the gun and setting the rivets.

The hydraulic gun illustrated in the drawings has the gun body 10 which may consist of a tube of steel or other suitable material and which is externally threaded at one end as indicated by 11 and internally threaded at the other end as indicated by 12. The gun body 10 has secured to the threaded end 12 thereof the end portion 13 which is threadedly secured thereto, and part of the end portion 13 is reduced in diameter to provide the nozzle or end 14 which is pointed as indicated at 15 to seat in the entrance to the bore of a hollow rivet as shown in Fig. 3. The end portion 13 and end 14 have a longitudinally extending central hole therein to form the pressure chamber 16, and leading outwardly from this chamber is the much smaller discharge hole 17 extending axially to the point 15 of the gun.

The part of the end portion 13 that lies within the gun body 10 is provided with a specially constructed stuffing box consisting of the hollow threaded nut 18 and stuffing materials 19 which preferably is formed of textile fibers, a mineral filler and a substantial quantity of graphite. The purpose of this stuffing box is to provide a tight joint around a sliding plunger 20 which passes through this stuffing box into the hydraulic pressure chamber 16 and is adapted to be advanced in this chamber to subject the oil or other liquid 21 therein to the high pressure needed to expand or set the rivet 22.

This rivet 22 which may have the construction disclosed in the above mentioned Jakosky patent has the head 23 and shank 24 in which is formed the longitudinally extending bore adapted to receive the rivet expanding liquid 21. The rivet shown has the entrance to the bore in the head thereof reduced in diameter as at 25. This rivet is shown in Fig. 3 as having been expanded by the hydraulic pressure sufficiently to produce the bulbous inner end or head 26. The hydraulic pressure produced within the bore of the rivet 22 serves also to expand the shank portion of the rivet so that it will fit tightly within the holes formed in the plates 27 and 28, in addition to providing the head 26 at the inner end of the rivet.

In dealing with the high pressures herein contemplated it is not practical to construct the sliding plunger 20 so that it will fit tight enough in the bore of the chamber 16 to prevent the liquid from flowing around the plunger. Therefore, the plunger 20 is preferably made considerably smaller in diameter than the bore of the chamber 16 as shown in Fig. 3 so that the plunger will slide freely in this chamber, and the stuffing box 18, 19 is relied upon to prevent the liquid from escaping from the pressure chamber around the plunger 20.

In carrying out the present invention, it is important to provide means for introducing hydraulic liquid into the chamber 16, at the will of the operator, each time the pointed end 15 of the gun is engaged with the rivet to be expanded or set. It is also important to so construct the chamber 16 that the liquid cannot escape therefrom even when subjected to the high pressure required to expand the rivet except by passing outwardly through the aperture 17.

Therefore in the construction shown the end portion 13 is provided with the lateral passage 29 leading into the chamber 16 and the flow of liquid through this passage is controlled by the one-way valve 30, best shown in Fig. 3, and which is specially constructed to withstand the high pressures to which it is subjected. This valve is preferably formed by drilling a relatively large hole laterally in the end portion 13 in alignment with the passage 29 and the bottom of this hole is tapered as at 31 to receive a correspondingly tapered metal plug 32 which is accurately fitted to the tapered seat 31, and the plug 32 is firmly clamped against this seat by the threaded hollow nut 33. In this manner the threads of the nut 33 are protected by the tapered plug 32 from the hydraulic pressure. The plug 32 has a central liquid passage and at the inner end thereof is provided a tapered seat against which the conical valve 34 is normally seated by the coiled spring 35. The valve 34 is shown as having a relatively long stem 36 adapted to prevent this valve from getting out of alignment with its seat. The plug 32 has an outwardly extending tubular portion forming a pipe 37 that is threaded at its outer end for connection by a pipe coupling, to means for supplying liquid to the chamber 16 and one-way valve member 34 under a moderate pressure, say 30 to 80 pounds per square inch which is sufficient to unseat the valve 34 and cause the liquid 21 to flow into the chamber 16.

The means for supplying the hydraulic liquid under pressure to the valve mechanism just described should be such that it can be at all times controlled manually by the person operating the gun, so that this liquid will not be admitted to the hydraulic chamber 16 to escape from the aperture 17 except when the gun is being used to expand a rivet. Various types of valves to this end may be employed but such valve preferably is so constructed that it is normally urged by a spring to its closed position, and is provided with a push button adapted to be manually operated momentarily to introduce sufficient liquid in the gun to fill the bore of the rivet 22 and the chamber 16, so that the moment the plunger 20 starts to move forward in this chamber 21 it will subject the liquid to a tremendous pressure.

In the construction shown such a push button controlled valve is provided by securing to one side of the gun body 10 near the above mentioned inlet passage 29 the block shaped member 38 which is bolted to the barrel at 39. This member 38 has the threaded connection 40 for coupling one end thereof to the tubular extension 37 that extends outwardly from the plug 32. Within the block 38 is formed the liquid passage 41 that leads to the coupling 40 and valve 30.

The flow of liquid to the passage 41 is controlled by the one way valve 42 which is normally held closed by the spring shown but is opened by manually pressing upon the push button 43. Liquid is supplied to the chamber in which the valve 42 is mounted by the liquid passage 44 and transversely extending passage 45 extends inwardly from a side wall of the block 38. Oil or other operating liquid is conveniently supplied to the passage 45 under the desired pressure, by the flexible hose 46 having one end attached to the block 38 and the other end attached to the pressure tank 47 to be described.

It will be seen from the foregoing that the hydraulic chamber 16 can be filled with hydraulic liquid whenever desired by momentarily depressing the push button 43.

The high operating pressure is produced in the chamber 16, when desired, by advancing the plunger 20 within the chamber 16, from the position in which it is shown in Fig. 2 to the position in which it is shown in Fig. 3, and since the fluid displacing action of this plunger as it is advanced is relied upon to produce the high hydraulic pressure in the chamber 16, means must be provided for exerting a powerful forward movement upon the plunger 20. One highly satisfactory form of operating means to this end will now be described.

Within the tubular gun body 10 there is mounted the sliding head consisting of the longitudinally extending shaft 48 which is provided near its opposite ends with the disks 49 and 50 which fits slidably within the tube 10, and one end of the shaft 48 has a hole formed therein to receive one end of the plunger 20 which is secured therein by the set screw 51. Movement of this sliding head away from the hydraulic pressure chamber 16 is arrested by the stop 52 and this sliding head is continuously urged towards the stop 52 by the coil spring 53 which is housed within the tube 10.

Movement of this sliding head in the opposite direction is secured by providing the toggle link consisting of the link members 54 and 55 which are pivotally connected one to the other at 56. One end of this toggle link 54, 55 is pivotally secured to the shaft 48 at 57 and the other end of this toggle link is pivotally secured at 58 to the disk member 59 mounted for limited sliding movement in the end portion of the tube 10. Operating movement is imparted to the toggle link in a direction to straighten the same by the bolt 60 which extends transversely of the gun and outwardly through an opening 61 formed through the tube 10. One end of this bolt 60 is connected to the pin 56 of the toggle link and the other end is threaded and is provided with a nut 62 that is adapted to receive the pressure of the short arm 63 of the manually operated lever 64 that is pivoted at 65 to ears 66 extending laterally from the tube 10.

The threaded end 11 of the gun body 10 has threaded thereupon the cap 67 which forms a stop to arrest the movement of the disk 59 when the lever 64 is actuated to straighten out the toggle link. A spring 68 confined between the cap 67 and disk 59 normally holds the toggle link in the bent condition in which it is shown in Fig. 2. The arrangement is such that when the lever 64 starts to move towards the dotted line position in which it is shown in Fig. 1 it will start to straighten out the toggle link. This will move the disk 59 towards the cap 67 until it abuts firmly thereagainst, whereupon the further straightening out of this toggle will advance the plunger 20 in the chamber 16 with sufficient force to build up a tremendous pressure in this chamber. As soon as the manual pressure upon the lever 64 that urges it towards the gun body is released, the parts will return to the position in which they are shown in Fig. 2 under the spreading action of the springs 53 and 68.

The amount of movement imparted to the plunger 20 in the chamber 16, when the lever 64 is moved from the full to the dotted position of Fig. 1, may be varied as desired by rotating the cap 67 relative to the tube 10 to which it is threaded, to thereby move this cap toward or from the disk 59. This will control the amount of movement imparted to the plunger 20 by the toggle link. When the cap 67 is rotated to the desired position of adjustment, it is locked in this position by tightening the set screw 69.

It is important that the tapered end 15 of the gun be firmly seated against the head 23 of the rivet to form a liquid type seal before the lever 64 is depressed to subject the liquid 21 in the rivet 22 to the rivet expanding pressure. In order that the operator may be sure that he is exerting sufficient pressure upon the rivet before he operates the lever 64, the gun shown is provided with the sliding head 70 having the barrel portion 71 that slidably embraces the cap 67 so that this head may slide lengthwise of the gun a short distance, determine by the length of the slots 72 formed in the barrell 71 and which slots receive the screws 73 that are screwed into the cap 67. The head 70 is continuously urged away from the outer end of the cap 67 by the coiled spring 74.

The construction of the gun is such that the gun body 10 may be conveniently grasped in the left hand so that the push button 43 may be depressed when desired by the thumb, and the lever 64 may be operated by the fingers. The head 70 of the gun is grasped in the right hand. As soon as the point 15 of the gun has been engaged with the head of the rivet, as shown for example in Fig. 1, sufficient pressure should be exerted by the right hand on the head 70 to compress the spring 74 and cause this head to strike against the end of the cap 67. This striking of the head against the cap indicates to the gun operator that he is exerting sufficient pressure upon the gun to cause its point 15 to form a liquid type connection with the rivet. He then depresses the button 43 momentarily to fill the bore of the rivet and the gun chamber 16 with the hydraulic liquid. He is then ready to expand hydraulically the rivet 22 by depressing the lever 64, and since the operating liquid is supplied to the gun under pressure, the momentary opening of the valve 42 will fill the chamber 16 and the hollow rivet 22. Therefore, the moment the plunger 20 starts to advance in the chamber 16 under the operation of the lever 64 it will begin to place this liquid under high pressure and start expanding the rivet 22.

The amount the rivet will be expanded may be accurately controlled by rotating the cap 67 in one direction or the other upon the tube 10 as described. It will be seen from the foregoing that the operations of the gun to set a rivet are extremely simple, and they do not require a manual pressure upon the lever 64 or head 70 of more than a few pounds. It has been found in practice that an experienced operator can set nearly sixty rivets per minute.

When a beginner starts using the gun he may have a tendency to depress the lever 64 before the head 70 has been fully depressed, in which case the point 15 of the gun may not be engaged with the rivet with sufficient force to prevent the liquid that is forced into the rivet from escaping at the entrance to the rivet, in which case the rivet will not be hydraulically expanded. To overcome this difficulty the gun may be provided with the slide 75 which is normally urged by the spring 76 to the position in which it is shown in Fig. 2 so that it will overlie a projection 77 upon the bolt 60 to thereby hold the lever 64 from being actuated until the head 70 is depressed sufficiently to engage the end 78 of the slide 76 and move this slide to the bolt releasing position.

While the guns of the present invention may be used to hydraulically set rivets of various sizes, it is contemplated that the gun will usually be employed to set small rivets the shanks of which have an outside diameter of less than ¼ of an inch. When these small rivets are being set the operator should be able to work all day without using as much as a pint of oil or other hydraulic operating liquids. Therefore, the liquid supply tank 47 may be quite small and can be conveniently strapped to the operator's belt or otherwise carried by the rivetor.

In preparing to operate the gun the tank 47 should be filled about ¾ full with oil or other operating liquid. This may be done by removing the screw plug 79, which plug should be replaced after the desired amount of liquid has been introduced into the tank 47. This liquid is then placed under pressure by forcing air into the tank above the liquid through the connection 80 which may be similar to that of the air valve of the ordinary pneumatic tire. The gauge 81 will show the pressure within the tank, which preferably should be maintained between 30 and 80 pounds per square inch, as above stated as this is found sufficient to fill quickly the hollow rivet 22 and chamber 16 when the button 43 is momentarily depressed. Since the discharge aperture 17 is extremely small the oil 21 will not drain from the chamber 16 when the gun is removed from a rivet, therefore not much hydraulic liquid is used by the gun except that needed to fill the hollow rivets and expand them.

Having thus described my invention, what I claim and desire to protect by Letters Patent is:

1. An hydraulic gun for forcing a quantity of liquid into the bore of an hydraulic expandable rivet, comprising a gun body having an end portion formed with a pressure chamber and an apertured end adapted for liquid-tight engagement with the entrance to said bore, a plunger slidable in said chamber, toggle means disposed in axial alignment with said plunger and adapted to be moved from its angular to its straight position to advance the plunger in the chamber and force the liquid through said aperture, and an adjustable stop at one end of the toggle to thereby vary the amount of movement imparted to the plunger by straightening the toggle so as to deliver an adjustable measured quantity of liquid into the bore of the rivet.

2. An hydraulic gun for forcing a quantity of liquid into the bore of an hydraulic expandable rivet, comprising a gun body having an end portion formed with a pressure chamber and a pointed apertured end adapted to seat in the entrance to said bore, and a pressure receiving head yieldingly attached to the gun and operable to indicate to the user of the gun when it is seated against the rivet by a force in excess of a definite selected force.

3. An hydraulic gun for forcing a quantity of liquid into the bore of an hydraulic expandable rivet, comprising a gun body having an end portion formed with a pressure chamber and a pointed apertured end adapted to seat in the entrance to said bore, a plunger slidable in said chamber, a manually operable lever for moving the plunger forward in the chamber to force the liquid therefrom, a lock for normally holding the lever inoperative, and a pressure receiving head yieldingly mounted on the gun and operable when subjected to a force in excess of a definite selected force to release said lock.

ARMAND R. GAMACHE.

REFERENCES CITED

The following references are of record in the file of this patent:

UNITED STATES PATENTS

| Number | Name | Date |
|---|---|---|
| 1,513,385 | Good | Oct. 28, 1924 |
| 1,619,126 | Hundemer | Mar. 1, 1927 |
| 1,787,783 | Goddard | Jan. 6, 1931 |
| 1,804,582 | Woodruff | May 12, 1931 |
| 1,840,111 | Kreidel | Jan. 5, 1932 |
| 1,847,188 | Kreidel | Mar. 1, 1932 |
| 1,949,497 | Stafford | Mar. 6, 1934 |
| 1,964,866 | Watson | July 3, 1934 |
| 1,969,920 | Andrews | Aug. 14, 1934 |
| 2,027,500 | Vanderlip | Jan. 14, 1936 |
| 2,048,736 | Esser | July 28, 1936 |